(12) United States Patent
Saeki

(10) Patent No.: US 8,693,138 B2
(45) Date of Patent: Apr. 8, 2014

(54) BASE UNIT

(71) Applicant: Nidec Corporation, Kyoto (JP)

(72) Inventor: Shintaro Saeki, Kyoto (JP)

(73) Assignee: Nidec Corporation, Kyoto (JP)

( * ) Notice: Subject to any disclaimer, the term of this patent is extended or adjusted under 35 U.S.C. 154(b) by 0 days.

(21) Appl. No.: 13/770,374

(22) Filed: Feb. 19, 2013

(65) Prior Publication Data

US 2013/0301161 A1 Nov. 14, 2013

Related U.S. Application Data

(60) Provisional application No. 61/645,207, filed on May 10, 2012.

(51) Int. Cl.
*G11B 33/12* (2006.01)
*H02K 3/50* (2006.01)
*H02K 5/22* (2006.01)
*G11B 19/20* (2006.01)

(52) U.S. Cl.
USPC .................. 360/99.08; 360/98.07; 310/71

(58) Field of Classification Search
USPC .......... 360/98.07, 99.08, 99.15, 99.16, 99.25; 310/71, 67 R
See application file for complete search history.

(56) References Cited

U.S. PATENT DOCUMENTS

| | | | |
|---|---|---|---|
| 5,548,458 A * | 8/1996 | Pelstring et al. | ........... 360/99.08 |
| 7,012,191 B1 | 3/2006 | Watanabe et al. | |
| 8,120,217 B2 * | 2/2012 | Yawata et al. | ................... 310/71 |
| 8,120,872 B2 | 2/2012 | Sekii et al. | |
| 8,299,668 B2 * | 10/2012 | Yawata et al. | ................... 310/71 |
| 8,324,771 B2 * | 12/2012 | Yawata et al. | ................... 310/71 |
| 8,363,352 B2 | 1/2013 | Kang | |
| 2005/0206255 A1 * | 9/2005 | Yoshino et al. | ................. 310/71 |
| 2006/0138886 A1 * | 6/2006 | Ito et al. | ......................... 310/89 |
| 2006/0265871 A1 * | 11/2006 | Ito et al. | ......................... 29/854 |

(Continued)

FOREIGN PATENT DOCUMENTS

JP   05-207717 A   8/1993
JP   05-070184 U   9/1993

(Continued)

OTHER PUBLICATIONS

Sekii et al., "Motor and Disk Drive Apparatus", U.S. Appl. No. 13/564,934, filed Aug. 2, 2012.

(Continued)

*Primary Examiner* — Will J Klimowicz
(74) *Attorney, Agent, or Firm* — Keating & Bennett, LLP

(57) ABSTRACT

A base unit includes a stator, a wiring substrate, and a base portion. The base portion includes a tubular portion, a first recess portion surrounding the tubular portion, and first through-holes arranged within the first recess portion. The wiring substrate includes a connection portion arranged on an upper surface of the base portion and provided with lands, a power feeding portion arranged on a lower surface of the base portion, and an extension portion arranged to interconnect the connection portion and the power feeding portion. A first bonding layer is arranged between the connection portion and a bottom of the first recess portion to bond the connection portion and the bottom of the first recess portion. A second bonding layer is arranged between the power feeding portion and the lower surface of the base portion to bond the power feeding portion and the lower surface of the base portion.

35 Claims, 11 Drawing Sheets

(56) References Cited

U.S. PATENT DOCUMENTS

| | | |
|---|---|---|
| 2007/0247010 A1 | 10/2007 | Ichizaki |
| 2007/0278880 A1 | 12/2007 | Wada et al. |
| 2008/0019038 A1 | 1/2008 | Xu et al. |
| 2008/0084142 A1 | 4/2008 | Ino et al. |
| 2008/0309204 A1* | 12/2008 | Yamada ............... 310/68 B |
| 2009/0195095 A1* | 8/2009 | Yawata et al. ............ 310/71 |
| 2010/0177627 A1 | 7/2010 | Ino et al. |
| 2010/0329104 A1* | 12/2010 | Yawata et al. ............ 369/264 |
| 2012/0113791 A1* | 5/2012 | Yawata et al. ............ 369/258.1 |
| 2012/0200957 A1 | 8/2012 | Yawata |
| 2013/0050874 A1* | 2/2013 | Yawata et al. ............ 360/99.08 |

FOREIGN PATENT DOCUMENTS

| | | | |
|---|---|---|---|
| JP | 05-316704 A | | 11/1993 |
| JP | 06-343242 A | | 12/1994 |
| JP | 08-033253 A | | 2/1996 |
| JP | 08-237899 A | | 9/1996 |
| JP | 08-275439 A | | 10/1996 |
| JP | 10-108424 A | | 4/1998 |
| JP | 10094206 A | * | 4/1998 |
| JP | 2003-153481 A | | 5/2003 |
| JP | 2004282880 A | * | 10/2004 |
| JP | 2005-253239 A | | 9/2005 |
| JP | 2007-295666 A | | 11/2007 |
| JP | 2008-005588 A | | 1/2008 |
| JP | 2008-092714 A | | 4/2008 |
| JP | 2008211961 A | * | 9/2008 |
| JP | 2009-110611 A | | 5/2009 |
| JP | 2011-114892 A | | 6/2011 |
| JP | 2012-005339 A | | 1/2012 |

OTHER PUBLICATIONS

Saeki et al., "Spindle Motor and Disk Drive Apparatus", U.S. Appl. No. 13/767,228, filed Feb. 14, 2013.
Tamaoka et al., "Motor and Disk Drive Apparatus", U.S. Appl. No. 13/564,900, filed Aug. 2, 2012.
Fujinawa et al., "Base Member, Motor, and Disk Drive Apparatus", U.S. Appl. No. 13/770,395, filed Feb. 19, 2013.
Matsumoto et al., "Base Unit, Motor and Disk Drive Apparatus", U.S. Appl. No. 13/770,355, filed Feb. 19, 2013.
Saeki et al., "Stopper, Motor, and Disk Drive Apparatus", U.S. Appl. No. 13/767,194, filed Feb. 14, 2013.
Masumi et al., "Base Plate, Base Unit, Motor, Disk Drive Apparatus and Method of Manufacturing the Base Plate", U.S. Appl. No. 13/789,974, filed Mar. 8, 2013.
Tatsumi et al., "Base Plate, Base Unit, Motor and Disk Drive Apparatus", U.S. Appl. No. 13/788,140, filed Mar. 7, 2013.
Shiraishi et al., "Motor and Disk Drive Apparatus", U.S. Appl. No. 13/783,733, filed Mar. 4, 2013.
Sato et al., "Spindle Motor and Disk Drive Apparatus", U.S. Appl. No. 13/780,447, filed Feb. 28, 2013.
Matsumoto et al., "Spindle Motor and Disk Drive Apparatus", U.S. Appl. No. 13/792,448, filed Mar. 11, 2013.
Matsumoto et al., "Spindle Motor and Disk Drive Apparatus", U.S. Appl. No. 13/792,400, filed Mar. 11, 2013.
Matsumoto et al., "Base Unit, Motor and Disk Drive Apparatus", U.S. Appl. No. 13/785,194, filed Mar. 5, 2013.
Matsumoto et al.,"Spindle Motor and Disk Drive Apparatus", U.S. Appl. No. 13/798,842, filed Mar. 13, 2013.
Sato et al., "Spindle Motor and Disk Drive Apparatus", U.S. Appl. No. 13/798,827, filed Mar. 13, 2013.
Ishino et al., "Motor and Disk Drive Apparatus", U.S. Appl. No. 13/794,864, filed Mar. 12, 2013.

* cited by examiner

BASE UNIT

BACKGROUND OF THE INVENTION

1. Field of the Invention

The present invention relates to a base unit for use in a motor and a disk drive apparatus.

2. Description of the Related Art

Conventionally, a disk drive apparatus such as a hard disk drive apparatus or the like is equipped with a spindle motor for rotating a disk. The disk drive apparatus includes a disk, a housing, a stator, a FPC (Flexible Printed Circuit), and so forth. The housing includes a cover part, a base part, and so forth.

In recent years, the disk drive apparatus has been required to become smaller in height and size. Particularly, in order to reduce the height of a 2.5-type disk drive apparatus having a thickness of 7 mm or less, which is used in small-size disk drive apparatuses, it is necessary to reduce the thickness of a housing or a motor arranged within the housing. In general, the motor includes a hub, a coil, a stator core, a wiring substrate, a base part, etc. When assembling the motor, these components are arranged to axially overlap with one another. For the sake of reducing the thickness of the motor, these components need to be made thin. A lead wire is led out from the coil and is soldered onto the wiring substrate. However, if the motor becomes smaller in height, the wiring substrate is also reduced in size. Therefore, as compared with a case where a large-size wiring substrate is in use, it becomes difficult to perform a task of arranging the wiring substrate on the base part.

When the lead wire is soldered onto the wiring substrate, it is necessary to fix the wiring substrate onto the base part. The wiring substrate is fixed to the base part by a sticky material or the like arranged on the wiring substrate. However, if the wiring substrate becomes smaller in size, it is difficult to carry out a task of positioning the wiring substrate on the base part. As a result, the wiring substrate may be fixed to the base part in a deviated position.

Accordingly, a demand has existed to fix the wiring substrate to the base part in a predetermined position while reducing the overall height of the motor.

SUMMARY OF THE INVENTION

A spindle motor according to a preferred embodiment of the present invention includes a stationary unit, a rotary unit, and a bearing mechanism. The stationary unit includes a base portion, a stator including a plurality of coils, and a wiring substrate electrically connected to the stator.

The base portion includes a tubular portion in which the stator is arranged, a first recess portion arranged on the upper surface of the base portion so as to surround the tubular portion, and a plurality of first through-holes arranged within the first recess portion to extend through the upper surface and the lower surface of the base portion. The wiring substrate includes a connection portion arranged on the upper surface of the base portion and provided with a plurality of lands electrically connected to the coils, a power feeding portion arranged on the lower surface of the base portion, and an extension portion arranged to interconnect the connection portion and the power feeding portion.

The first through-holes axially overlap with at least a portion of at least one of the lands. At least one lead wire is led out from at least one of the coils and the lead wire is soldered to the corresponding land within the corresponding first through-hole. A first bonding layer is arranged between the connection portion and a bottom of the first recess portion to bond the connection portion and the bottom of the first recess portion together. A second bonding layer is arranged between the power feeding portion and the lower surface of the base portion to bond the power feeding portion and the lower surface of the base portion together.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

In the following description, the upper side in FIG. 1 along a center axis direction of a motor will be just referred to as "upper" and the lower side as "lower". The up-down direction is not intended to indicate the positional relationship or the orientation when the motor is installed within an actual device. The direction parallel or substantially parallel to the center axis will be referred to as "axial". The radial direction about the center axis will be just referred to as "radial". The circumferential direction about the center axis will be just referred to as "circumferential".

Figure 1:
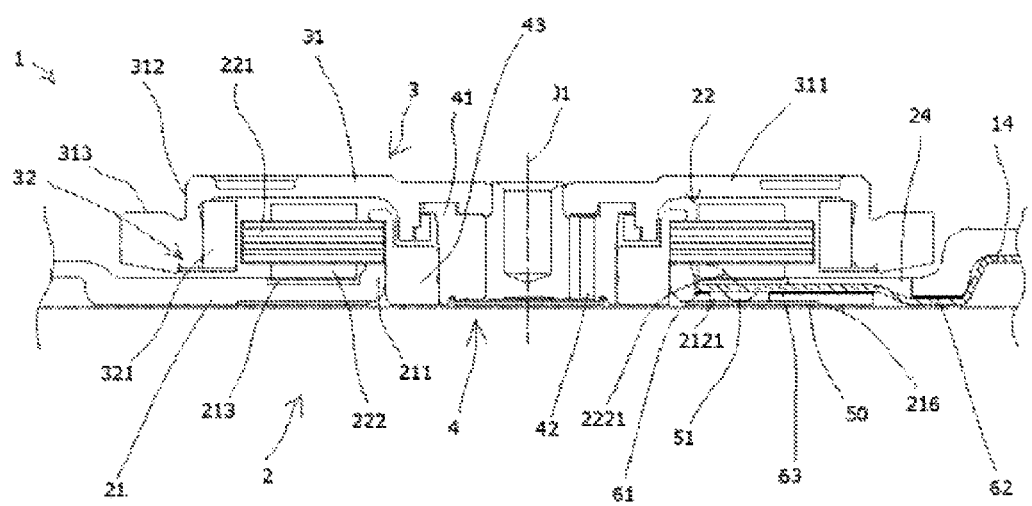
FIG. 1 is a sectional view showing a base unit according to a preferred embodiment of the present invention.

FIG. 1 is a sectional view of a spindle motor 1 according to one illustrative preferred embodiment of the present invention. In the following description, the spindle motor 1 will be just referred to as "motor 1". The motor 1 is preferably used in a 2.5-type disk drive apparatus having a thickness of about 7 mm or less (e.g., a hard disk drive apparatus), for example. The disk drive apparatus preferably includes a motor 1, a housing, at least one disk, an access unit, a connector, and so forth. The disk is attached to the motor 1. The access unit performs at least one of information reading and writing tasks with respect to the disk. A base portion defines a portion of the housing in cooperation with a cover member.

As shown in FIG. 1, the motor 1 is preferably of an outer-rotor-type. In the present preferred embodiment, the motor is preferably a three-phase motor having three phases, namely a U-phase, a V-phase and a W-phase. The motor preferably includes a stationary unit 2 as a fixed assembly, a rotary unit 3 as a rotating assembly, and a fluidic dynamic-pressure bearing mechanism (hereinafter referred to as "bearing mechanism 4"). By virtue of the bearing mechanism 4, the rotary unit 3 is rotatably supported with respect to the stationary unit 2 to rotate about the center axis J1 of the motor 1.

The stationary unit 2 preferably includes a base portion 21, a ring-shaped stator 22, and a wiring substrate 14. A tubular portion 211 having a substantially cylindrical shape is arranged substantially at the center of the base portion 21. The stator 22 is arranged around the tubular portion 211. The stator preferably includes a stator core 221 and coils 222. The coils 222 are provided with the stator core 221. In the stator 22, a plurality of (three, in the present preferred embodiment) lead wires led out from the U, V and W phase coils are respectively connected to the wiring substrate 14 by soldering. Thus, the stator 22 is electrically connected to the wiring substrate 14.

One preferred example of the wiring substrate 14 in accordance with a preferred embodiment includes a flexible printed circuit board. The wiring substrate 14 lies on the upper surface of the base portion 21 and extends from the rotary unit 3 toward a second through-hole 24.

The stator core 221 preferably includes a core-back (not shown) and a plurality of teeth (not shown). The core-back preferably has a ring shape about the center axis J1. The teeth extend radially outward from the outer edge portion of the core-back. Each of the teeth preferably includes a winding portion and a tip end portion. A conductive wire is wound on the winding portion so as to define each of the coils 222. The tip end portion extends from the outer edge portions of the winding portion in the circumferential opposite directions.

As shown in FIG. 1, the rotary unit 3 preferably includes a rotor hub 31 and a magnetic member 32. The rotor hub 31 preferably includes a hub body 311, a cylinder portion 312, and a ring-shaped disk placing portion 313. The cylinder portion 312 protrudes downward from the outer edge portion of the hub body 311. The disk placing portion 313 extends radially outward from the lower end of the cylinder portion 312. A disk (not shown) is placed on the disk placing portion 313. The magnetic member 32 preferably includes a ring-shaped rotor magnet 321 extending about the center axis J1. The rotor magnet 321 is arranged inside the cylinder portion 312. The disk placing portion 313 is positioned radially outward of the upper portion of the rotor magnet 321. The rotor magnet 321 is arranged radially outward of the stator 22. In the motor 1, torque is generated between the rotor magnet 321 and the stator 22.

As shown in FIG. 1, the bearing mechanism 4 is a fluidic dynamic-pressure bearing and preferably includes a lubricant, a sleeve 41, and a bush 43. The sleeve 41 is a substantially cylindrical member. The sleeve 41 is preferably a sintered metal formed by, for example, baking and solidifying metal powder. The sleeve 41 includes a communication hole 42 extending through the sleeve 41 in the up-down direction. The sleeve 41 is impregnated with a lubricant. The bush 43 has a substantially cylindrical shape and supports the sleeve 41 on the inner surface thereof. The stator core 221 is fixed to the outer surface of the bush 43 preferably by, for example, press-fitting or caulking. The bush 43 is fixed to the inner surface of the tubular portion 21 preferably by, for example, press-fitting or the like.

Figure 2:
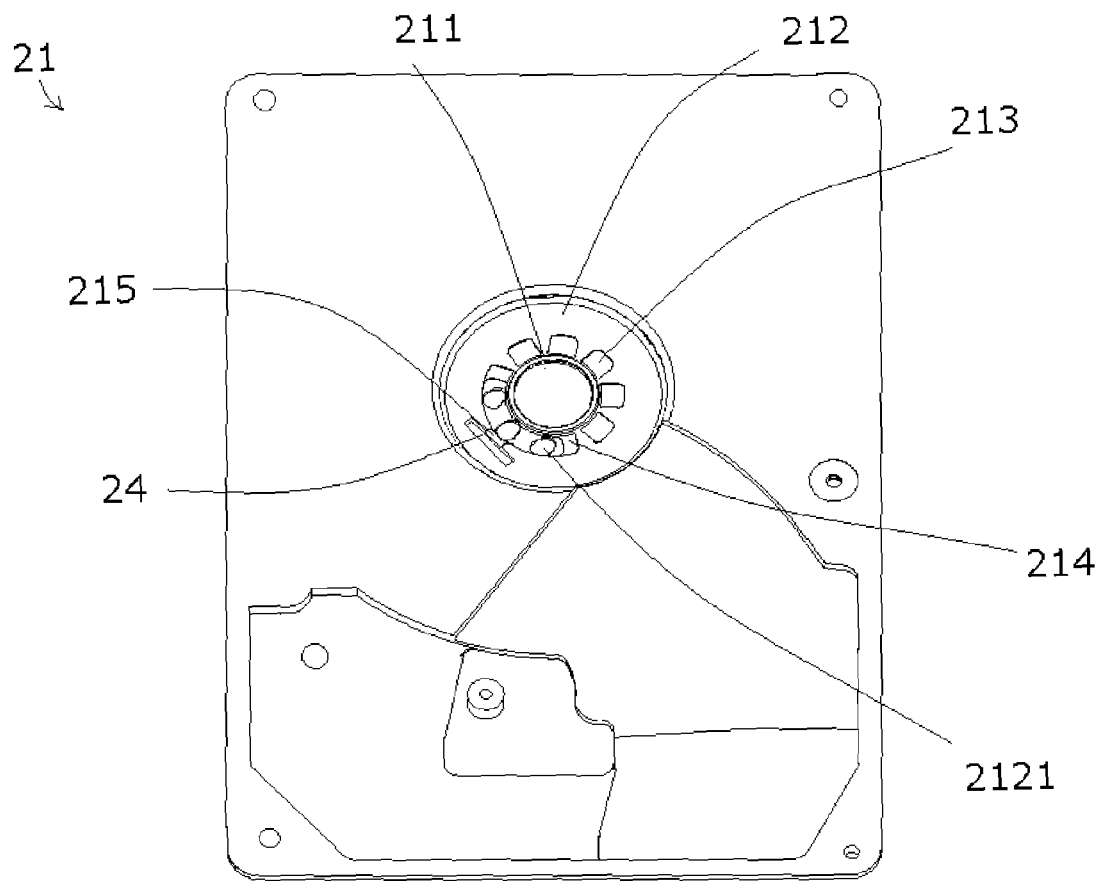
FIG. 2 is a top perspective view of a base portion according to a preferred embodiment of the present invention.
Figure 3:
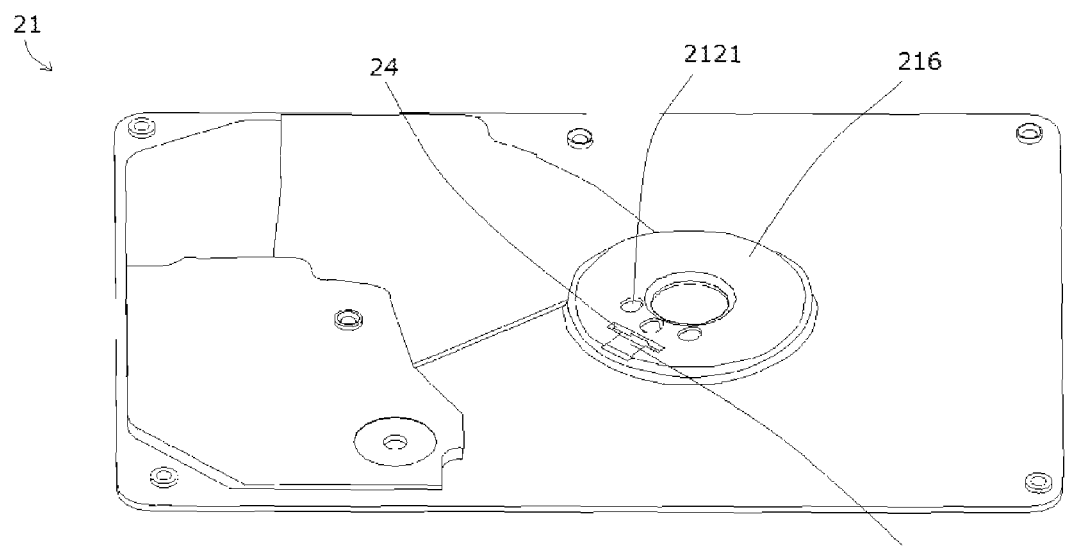
FIG. 3 is a bottom perspective view of the base portion according to a preferred embodiment of the present invention.

FIG. 2 is a perspective view of the base portion 21, depicting the upper surface side of the base portion 21. FIG. 3 is a perspective view of the base portion 21, depicting the lower surface side of the base portion 21. As described above, the tubular portion 211 is arranged in the base portion 21. A first recess portion 212 is arranged around the tubular portion 211. When viewed axially, the first recess portion 212 preferably has a substantially annular shape so as to surround the tubular portion 211. The first recess portion 212 is a portion defined on the upper surface of the base portion 21 and depressed toward the lower surface of the base portion 21. A plurality of coil receiving portions 213 is positioned within the first recess portion 212 and is arranged around the tubular portion 211 at a regular interval along the circumferential direction. The coil receiving portions 213 are not necessarily arranged at a regular interval and may be unevenly arranged. The coil receiving portions 213 are preferably portions arranged on the upper surface of the base portion 21 and depressed toward the lower surface of the base portion 21. A second recess portion 214 is arranged inside the first recess portion 212. The second recess portion 214 is a portion defined on the upper surface of the base portion 21 and depressed toward the lower surface (axial lower side) of the base portion 21. The second recess portion 214 preferably has a substantially arc-shaped configuration when viewed axially and extends in the circumferential direction along the tubular portion 211. A third recess portion 215 is arranged within the first recess portion 212. The third recess portion 215 is a portion depressed toward the lower surface of the base portion 21. Within the first recess portion 212, the third recess portion 215 extends radially outward from the second recess portion 214.

A second through-hole 24 axially extending through the base portion 21 is arranged radially outward of the third recess portion 215. The second through-hole 24 extends through the upper surface and the lower surface of the base portion 21. When viewed axially, the second through-hole 24 includes a contour extending at least in one direction. The contour of the second through-hole 24 preferably is rectangular or substantially rectangular. The circumferential width of the second through-hole 24 is larger than the circumferential width of the third recess portion 215. This makes it easy to, when assembling the motor, insert the extension portion 142 of the below-mentioned wiring substrate 14 into the second through-hole 24. As a result, it is possible to reduce the time required in assembling the motor.

As shown in FIG. 1, a plurality of first through-holes 2121 is arranged within the second recess portion 214. The first through-holes 2121 extend through the upper surface and the lower surface of the base portion 21. In the present preferred embodiment, there are arranged three first through-holes 2121. The first through-holes 2121 are arranged in the circumferential direction along the extension direction of the second recess portion 214. At least one of the coil receiving portions 213 is arranged within the second recess portion 214. In the second recess portion 214, at least one of the first through-holes 2121 extends through the coil receiving portions 213. The circumferential position of at least one of the first through-holes 2121 is the same as the circumferential position of the third recess portion 215.

A step portion (not shown) is preferably arranged in the second through-hole 24 of the third recess portion 215. A projection (not shown) protruding radially inward is preferably arranged on the inner surface defining the second through-hole 24. As shown in FIG. 3, a groove 26 is arranged in the end portion of the second through-hole 24 on the lower surface of the base portion 21. The groove 26 is axially opposed to the first recess portion 212. The groove 26 extends radially outward from the second through-hole 24. The extension direction of the groove 26 is parallel or substantially parallel to the extension direction of the third recess portion 215. The circumferential width of the groove 26 is smaller than the circumferential width of the second through-hole 24. Accordingly, when the wiring substrate 14 is arranged in the base portion 21 as shown in FIG. 1, it is possible to easily position the below-mentioned extension portion 142 on the lower surface of the base portion 21.

Figure 4A:
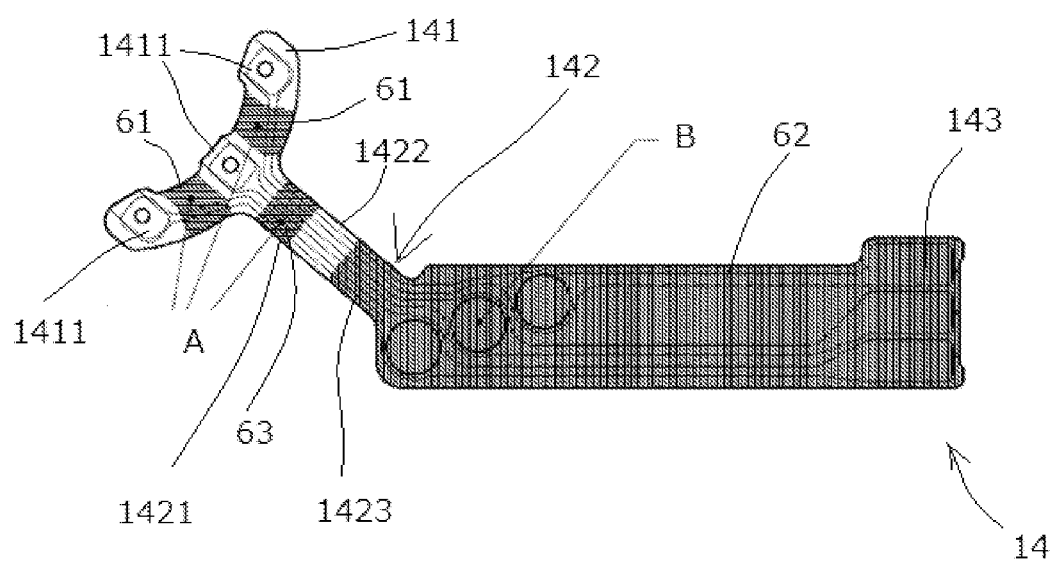
FIG. 4A is a plan view of a wiring substrate according to a preferred embodiment of the present invention.

FIG. 4A is a plan view of the wiring substrate 14. As shown in FIG. 4A, the wiring substrate 14 preferably includes a connection portion 141 and an extension portion 142. The connection portion 141 is arranged within the second recess portion 214. When viewed axially, the connection portion 141 has a substantially arc-shaped configuration corresponding to the shape of the second recess portion 214. When the connection portion 141 is arranged within the second recess portion 214 as shown in FIG. 1, the radial inner surface of the connection portion 141 makes contact with the outer surface of the tubular portion 211. This makes it possible to radially position the connection portion 141. The thickness of the connection portion 141 is equal to the axial depth of the second recess portion 214 or smaller than the axial depth of the second recess portion 214.

The connection portion 141 preferably includes a plurality of lands 1411. The respective lands 1411 are electrically connected to the coils 222. The respective lands 1411 are arranged on the connection portion 141 in a spaced-apart relationship with the adjoining lands 1411. The first through-holes 2121 preferably axially overlap with at least one of the lands 1411. In the present preferred embodiment, the connection portion 141 preferably includes three lands 1411, for example. The respective lands 1411 are arranged to axially overlap with the respective first through-holes 2121.

The extension portion 142 preferably includes a first extension portion 1421, a second extension portion 1422, a third extension portion 1423, and a power feeding portion 143. In the extension portion 142, the first extension portion 1421 adjoins the connection portion 141. The first extension portion 1421 is a region of the extension portion 142 opposed to the upper surface of the base portion 21. A first bonding layer 61 (to be described later) is preferably arranged in the first extension portion 1421. The second extension portion 1422 adjoins the first extension portion 1421. The second extension portion 1422 is a region of the extension portion 142 passing through the second through-hole 24. First, second, and third bonding layers 61, 62, and 63 to be described later are not arranged in the second extension portion 1422. The third extension portion 1423 is a region adjoining the second extension portion 1422. The third extension portion 1423 is a region of the extension portion 142 opposed to the lower surface of the base portion 21. A second bonding layer 62 to be described later is arranged on the third extension portion 1423. The power feeding portion 143 extends from the connection portion 141 and is connected to an external power source or the like. As shown in FIG. 4A, the second bonding layer 62 is arranged on the surface of the power feeding portion 143 opposed to the lower surface of the base portion 21.

The thickness of the extension portion 142 is equal or substantially equal to the axial depth of the third recess portion 215 or smaller than the axial depth of the third recess portion 215. Furthermore, the thickness of the extension portion 142 is preferably equal or substantially equal to the axial depth of the groove 26 or smaller than the axial depth of the groove 26.

A first bonding layer 61, a second bonding layer 62, and a third bonding layer 63 are arranged on the wiring substrate 14.

One surface of the wiring substrate 14 is axially opposed to the upper surface of the base portion 21. The first bonding layer 61 is arranged in a plurality of regions on one surface of the wiring substrate 14. The third bonding layer 63 is also arranged on one surface of the wiring substrate 14.

As shown in FIG. 4A, the first bonding layer 61 is preferably arranged around at least one of the lands 1411 on one surface of the wiring substrate 14. The first bonding layer 61 is arranged in a gap between the adjoining lands 1411. In the present preferred embodiment, the number of the lands 1411 preferably is three and, therefore, two gaps exist between the lands 1411, for example. The first bonding layer 61 is arranged in these two gaps.

If a plurality of gaps exists between the adjoining lands 1411 and 1411, it is preferred that the first bonding layer be arranged in at least one of the gaps. In the present preferred embodiment, the first bonding layer 61 is not arranged in a region where the connection portion 141 is connected to the extension portion 142.

The first bonding layer 61 is preferably not arranged on the respective lands 1411. The first bonding layer 61 may be arranged around the edges of the first through-holes 2121. The first bonding layer 61 may be arranged in the gaps between the first through-holes 2121 adjoining one another.

The third bonding layer 63 is preferably arranged on one surface of the first extension portion 1421. One surface of the first extension portion 1421 is axially opposed to the upper surface of the base portion 21. The first extension portion 1421 is a region adjoining the region where the connection portion 141 is connected to the extension portion 142. In other words, the third bonding layer 63 adjoins a region of the connection portion 141 where the first bonding layer 61 is not arranged. In the following description, a region of the wiring substrate 14 opposed to the upper surface of the base portion 21 and provided with the first bonding layer 61 and the third bonding layer 63 will be defined as an area A.

The other surface of the wiring substrate 14 is axially opposed to the lower surface of the base portion 21. The other surface of the second extension portion 1422 is opposed to the lower surface of the base portion 21. The second bonding layer is arranged on the other surface of the second extension portion 1422. In the following description, a region of the extension portion 142 and the power feeding portion 143 opposed to the lower surface of the base portion 21 and provided with the second bonding layer 62 will be defined as an area B.

The second bonding layer 62 and the third bonding layer 63 are not arranged in the second extension portion 1422.

A sheet-shaped sticky material or an adhesive agent is preferably used as the first bonding layer 61, the second bonding layer 62, and the third bonding layer 63. At least one of the first bonding layer 61, the second bonding layer 62, and the third bonding layer 63 may be a sheet-shaped sticky material while the remainder may be an adhesive agent. Other materials than the sheet-shaped sticky material or the adhesive agent may alternatively be used as the first bonding layer 61, the second bonding layer 62, and the third bonding layer 63.

Figure 4B:
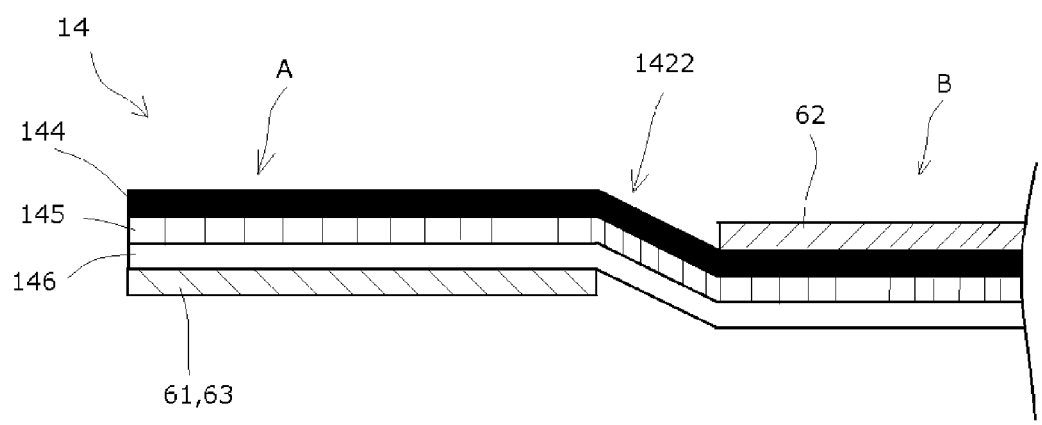
FIG. 4B is a partial sectional view of the wiring substrate according to a preferred embodiment of the present invention.

FIG. 4B is a partial sectional view of the wiring substrate 14 and is a conceptual diagram showing a region where the first bonding layer 61, the second bonding layer 62, and the third bonding layer 63 are arranged.

As shown in FIG. 4B, the wiring substrate 14 preferably includes preferably a base layer 144, a conductive wire layer 145, and a cover layer 146. The base layer 144 is preferably a layer made of a resin material. For example, polyimide is preferably used as the base layer 144. The conductive wire layer 145 is arranged on the upper surface of the base layer 144. The conductive wire layer 145 preferably includes a conductive member such as, for example, a copper foil or the like and delivers a current supplied from the external power source to the coils 222 through the power feeding portion 143. The cover layer 146 is preferably arranged on the upper surface of the conductive wire layer 145. The cover layer 146 is preferably made of a resin material such as, e.g., polyimide or epoxy.

In the region (area A) of the wiring substrate 14 opposed to the upper surface of the base portion 21 as shown in FIGS. 1 and 4B, the first bonding layer 61 or the below-mentioned third bonding layer 63 is arranged on the cover layer 146. In the region (area B) of the wiring substrate 14 opposed to the lower surface of the base portion 21, the second bonding layer 62 is arranged on the base layer 144. In the second extension portion 1422, the second bonding layer 62 and the third bonding layer 63 are not arranged on the base layer 144 and the cover layer 146.

Figure 5:
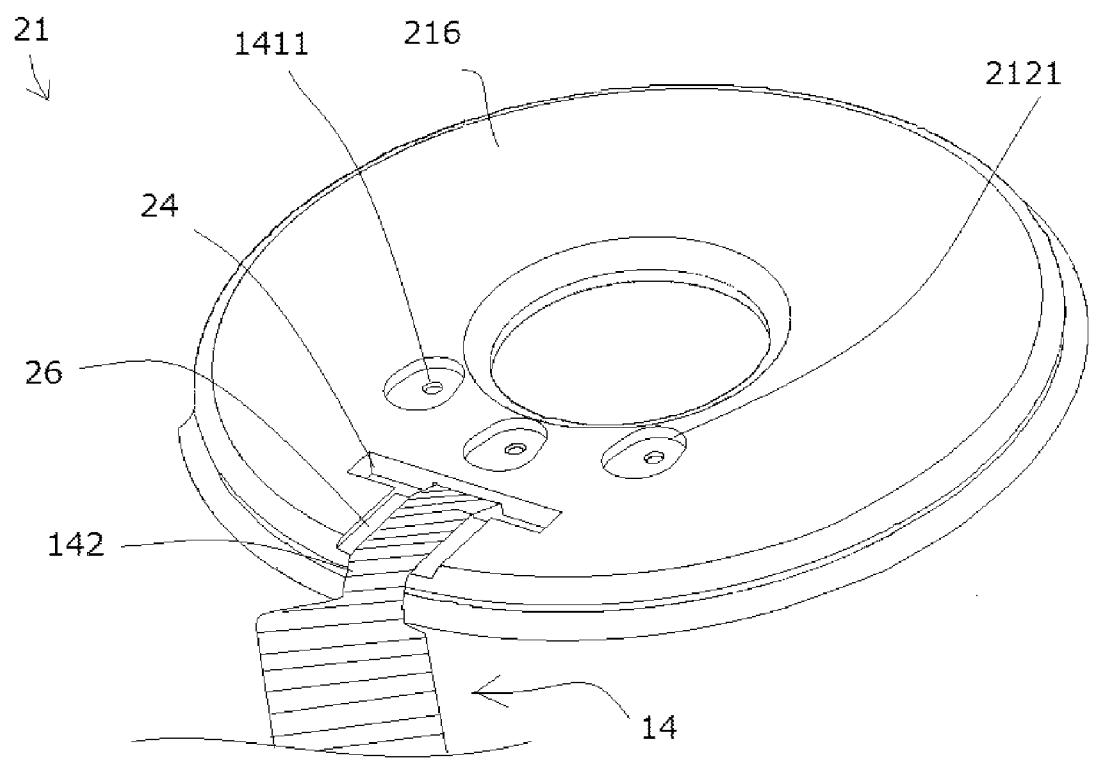
FIG. 5 is a perspective view of the base portion mounted with the wiring substrate according to a preferred embodiment of the present invention.
Figure 6:
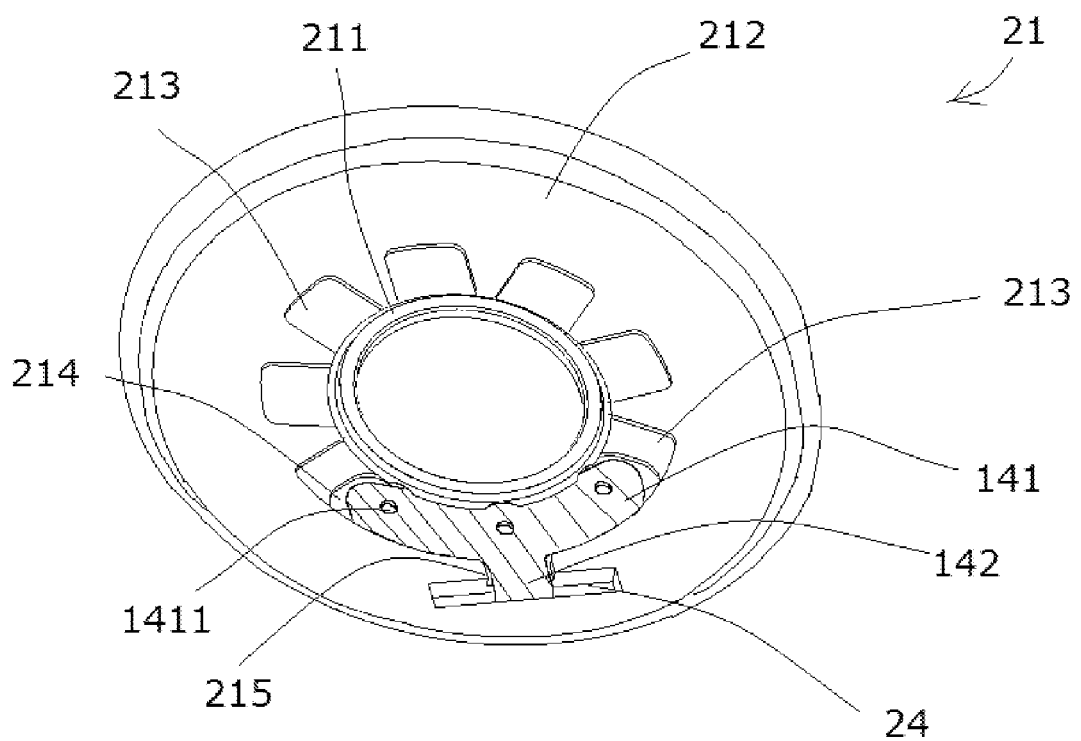
FIG. 6 is a perspective view of the base portion mounted with the wiring substrate according to a preferred embodiment of the present invention.

FIG. 5 is a partial plan view of the base portion 21. FIG. 6 is a partial rear view of the base portion 21. FIGS. 5 and 6 show the state in which the wiring substrate 14 is arranged on the base portion 21.

If the wiring substrate 14 is arranged on the base portion 21 as shown in FIGS. 1, 5, and 6, the connection portion 141 is arranged within the second recess portion 214. The first bonding layer 61 is arranged between the connection portion 141 and the bottom of the second recess portion 214 to thereby bond the connection portion 141 and the bottom of the second recess portion 214 together. The bottom of the second recess portion 214 is a portion of the bottom of the first recess portion 212.

As described above, the connection portion 141 corresponds in shape to the second recess portion 214. For that reason, the connection portion 141 does not circumferentially or radially protrude from the second recess portion 214. The connection portion 141 can be easily positioned on the base portion 21 on the basis of the second recess portion 214.

The connection portion 141 is bonded to the bottom of the second recess portion 214 by the first bonding layer 61. For that reason, even if a shock or force is applied from the outside to the base portion 21, the connection portion 141 is prevented from being detached from the base portion 21.

The first extension portion 1421 is arranged within the third recess portion 215. The third bonding layer 63 is arranged between the bottom of the third recess portion 215 and the first extension portion 1421. The third bonding layer 63 bonds the bottom of the third recess portion 215 and the first extension portion 1421 together. The bottom of the third recess portion 215 is a portion of the bottom of the first recess portion 212. For that reason, even if a shock or force is applied from the outside to the base portion 21, the first extension portion 1421 is not or is only barely detached from the base portion 21.

The extension portion 142 preferably extends from the upper surface of the base portion 21 to the lower surface of the base portion 21 through the second through-hole 24 and is arranged in the groove 26. In other words, the extension portion 142 extends from the upper surface of the base portion 21 to the lower surface of the base portion 21 through the second recess portion 214, the third recess portion 215 and the second through-hole 24. At this time, the first extension portion 1421 is arranged within the third recess portion 215. The second extension portion 1422 is arranged within the second through-hole 24. The third extension portion 1423 is arranged within the groove 26.

As stated above, the second bonding layer 62 is arranged on the other surface of the extension portion 142 including the third extension portion 1423. The second bonding layer 62 is also arranged between the bottom of the groove 26 and the third extension portion 1423. The second bonding layer 62 is also arranged on the surface of the power feeding portion 143 opposed to the lower surface of the base portion 21. The second bonding layer 62 bonds the bottom of the groove 26 and the third extension portion 1423 together. The bottom of the groove 26 is a portion of the lower surface of the base portion 21. The second bonding layer 62 is also arranged between the lower surface of the base portion 21 other than the groove 26 and the other surface of the extension portion 142 so as to bond them together. The second bonding layer 62 is arranged on the surface of the power feeding portion 143 opposed to the lower surface of the base portion 21s so as to bond them together.

Thus, the extension portion 142 is easily positioned with respect to the third recess portion 215, the second through-hole 24, and the groove 26. The extension portion 142 is bonded to the upper surface and the lower surface of the base portion 21 by the second bonding layer 62 and the third bonding layer 63. For that reason, even if a shock or force is applied from the outside, the extension portion 142 is not or is only barely detached from the base portion 21.

The second extension portion 1422 is a region of the extension portion 142 passing through the second through-hole 24. At least one of the second bonding layer 62 and the third bonding layer 63 is not arranged in the second extension portion 1422. In an even more preferred embodiment of the present invention, neither the second bonding layer 62 nor the third bonding layer 63 is arranged in the second extension portion 1422. Thus, the second bonding layer 62 and the third bonding layer 63 are not exposed within the second through-hole 24. As a result, the second extension portion 1422 is prevented from suffering gas generation and dust adherence otherwise caused by the first bonding layer 61 and the second bonding layer 62. Accordingly, the cleanness of the inside of the housing which is arranged to accommodate the motor 1 can be kept at a specified value.

In the present preferred embodiment, the thickness of the connection portion 141 is preferably equal or substantially equal to the axial depth of the second recess portion 214 or smaller than the axial depth of the second recess portion 214. For that reason, it is possible to prevent the connection portion 141 from axially protruding from the second recess portion 214 when the wiring substrate 14 is arranged on the base portion 21. This makes it possible to prevent the connection portion 141 from making contact with the stator 22 and to reduce the axial dimension of the motor 1.

As shown in FIGS. 1 and 6, the first extension portion 1421 is preferably accommodated within the third recess portion 215. For that reason, when the wiring substrate 14 is arranged on the base portion 21, the first extension portion 1421 is easily positioned with respect to the base portion 21 and the wiring substrate 14 is easily positioned with respect to the base portion 21. The thickness of the first extension portion 1421 is preferably equal or substantially equal to the axial depth of the third recess portion 215 or smaller than the axial depth of the third recess portion 215. For that reason, the first extension portion 1421 is prevented from protruding axially upward from the third recess portion 215 beyond the upper surface of the base portion 21. This makes it possible to prevent the extension portion 142 from making contact with other portions of the motor 1 and to reduce the axial dimension of the motor 1.

The third extension portion 1423 is accommodated within the groove 26. For that reason, when the wiring substrate 14 is arranged on the base portion 21, the third extension portion 1423 is easily positioned with respect to the base portion 21 and the extension portion 142 is easily positioned with respect to the base portion 21. The thickness of the third extension portion 1423 is equal to the axial depth of the groove 26 or smaller than the axial depth of the groove 26. Thus, the third extension portion 1423 extending through the groove 26 does not protrude axially downward from the lower surface of the base portion 21. The third extension portion 1423 is positioned within the thickness of the base portion 21 having a flat shape. Accordingly, it becomes possible to reduce the axial overall size of the motor 1 just as much as the thickness of the wiring substrate 14.

As shown in FIGS. 2, 3, 5, and 6, when viewed axially, the contour of the second through-hole 24 is preferably rectangular or substantially rectangular. The longitudinal direction of the second through-hole 24 is perpendicular or substantially perpendicular to the direction extending from the second recess portion 214 toward the second through-hole 24. In the longitudinal direction of the second through-hole 24, the width of the second through-hole 24 is larger than the width of the second extension portion 1422 and the width of the third extension portion 1423.

As shown in FIGS. 1 and 3, a fourth recess portion 216 is arranged on the lower surface of the base portion 21 and is positioned at the axially opposite side of the first recess portion 212. The fourth recess portion 216 is a region depressed toward the lower surface of the base portion 21. When viewed axially, the fourth recess portion 216 preferably has an annular or substantially annular shape about the center axis J1. The first through-holes 2121 extending through the second recess portion 214 also extends through the fourth recess portion 216. In other words, the first through-holes 2121 extend from the second recess portion 214 to the fourth recess portion 216. The fourth recess portion 216 is arranged so as to at least partially overlap with the second recess portion 214 in the axial direction. The fourth recess portion 216 is radially arranged between the groove 26 and the opening of the tubular portion 211.

When a base unit is assembled by attaching the stator 22 to the base portion 21 as shown in FIG. 1, the fourth recess portion 216 is preferably sealed by a flat or substantially flat seal member 50. The seal member 50 corresponds in shape to the fourth recess portion 216. The axial depth of the fourth recess portion 216 is equal to the axial dimension of the seal member 50 or larger than the axial dimension of the seal member 50. When the fourth recess portion 216 is sealed by the seal member 50, it is possible to prevent the seal member 50 from protruding axially downward from the fourth recess portion 216 beyond the lower surface of the base portion 21. This makes it possible to reduce the axial dimension of a motor or a disk drive apparatus.

A plurality of lead wires 2221 led out from the coils 222 are connected to the lands 1411 of the connection portion 141. In the present preferred embodiment, three lead wires 2221 are connected to the lands 1411 because the motor 1 is a three-phase motor. In the present preferred embodiment, the lead wires 2221 are preferably connected to the lands 1411 by soldering. Thus, solder portions 51 are provided in the regions where the lead wires 2221 are connected to the lands 1411. Further, for example, a lead-free solder or a lead-containing solder can be used in soldering the lead wires 2221 to the lands 1411. The lead wires 2221 may alternatively be connected to the connection portion 141 by other methods, if so desired.

As shown in FIG. 1, at least a portion of each of the solder portions 51 is arranged within each of the first through-holes 2121. Thus, the solder portions 51 are positioned within the thickness of the base portion 21. The lands 1411 axially overlap with the first through-holes 2121. In other words, when the lower surface of the base portion 21 is seen from the axial lower side, the lands 1411 are visible through the first through-holes 2121. For that reason, when the lead wires 2221 are fixed to the lands 1411 by soldering or other methods, a jig or a soldering iron, for example, can be inserted into each of the first through-holes 2121 at the lower surface side of the base portion 21. As a result, the lead wires 2221 and the lands 1411 can be easily soldered within each of the first through-holes 2121.

At least a portion of each of the solder portions 51 is arranged within each of the first through-holes 2121. When the lower surface of the base portion 21 is seen at the axial lower side thereof, at least a portion of each of the solder portions 51 is visible through each of the first through-holes 2121. The axial lower ends of the solder portions 51 are positioned axially higher than the axial lower end of the fourth recess portion 216. Therefore, when the fourth recess portion 216 is sealed by the seal member 50, the solder portions 51 are prevented from making contact with the seal member 50.

Similarly, each of the solder portions 51 preferably falls into the thickness of the base portion 21 because at least a portion of each of the solder portions 51 is arranged within each of the first through-holes 2121. As a result, the solder portions 51 are prevented from protruding axially downward beyond the lower surface of the base portion 21.

The fourth recess portion 216 and the first through-holes 2121 are sealed by the seal member 50. Thus, dust or the like is prevented from entering the inside of the motor 1 from the outside through the fourth recess portion 216 and the first through-holes 2121.

The base portion 21 is preferably formed, for example, by a process including press workings. First, a flat raw member is arranged within a progressive mold. A series of press workings is performed with respect to the raw member, thereby forming the base portion 21 which includes the tubular portion 211, the first recess portion 212, the second recess portion 214, the third recess portion 215, the second through-hole 24, the first through-holes 2121, and the coil receiving portions 213 or the like.

In the base portion 21 subjected to the press workings, a cutting is carried out on the inner surface of the tubular portion 211. Thus, the inner surface of the tubular portion 211 becomes smooth. This preferably makes it possible to smoothly insert the sleeve 41 and to prevent deformation or clogging of the sleeve 41 during a press-fitting process. A cutting may be performed on the portions other than the tubular portion 211. For example, within the mold, other portions than the tubular portion 211, such as the entire upper and lower surfaces of the base portion 21, the first recess portion 212, the second recess portion 214, the third recess portion 215, and the fourth recess portion 216, may be subjected to a cutting as well as a press working.

In the base portion 21 subjected to the press working, undercuts or burrs are formed, e.g., in the peripheral edge of the tubular portion 211, the ends of the first through-holes 2121, the second through-hole 24, and the outer edge of the base portion 21 by, for example, punching the raw member with the mold. In particular, a cutting may be performed with respect to the burrs formed by the press working. If the burrs are removed by the cutting, the tubular portion 211 and the end of the second through-hole 24 become smooth. Therefore, when assembling the base portion 21, the components such as the stator and the like can be attached with no likelihood or substantially no likelihood of damage. By performing the press working, an undercut is preferably formed at the end of the tubular portion 211 on the lower surface of the base portion 21.

A plating work is performed with respect to the base portion 21 which has been subjected to the press working and the cutting work. For example, nickel-based metal is used as a plating metal. By virtue of the plating work, the base portion is preferably completely covered with a thin film of the plating metal. The thickness of the thin film may be, e.g., from about 2 μm to about 10 μm. Accordingly, it is possible to prevent the base portion 21 from being corroded by the lubricant of the bearing mechanism or due to the external environment.

In the base portion 21 subjected to the plating work, the thickness of the thin film at the end of the second through-hole 24 is larger than the thickness of the thin film on the upper surface of the base portion 21. Accordingly, when the wiring substrate 14 extends toward the upper surface and the lower surface of the base portion 21 through the second through-hole 24, it is possible to prevent the wiring substrate 14 from being damaged by the end of the second through-hole 24 or the step portion.

For example, only one first through-hole 2121 may be arranged in the second recess portion 214. In that case, the lead wires 2221 extending from the coils 222 are led to the single first through-hole 2121 and are connected to the lands 1411 preferably by, for example, soldering or other methods. Therefore, as compared with a case where a plurality of through-holes is arranged, it is possible to increase the rigidity of the base portion 21.

Even in case where a plurality of first through-holes 2121 is arranged in the second recess portion 214, there may be the first through-hole 2121 to which the lead wires 2221 are led and another through-hole to which the lead wires 2221 are not led.

The first bonding layer 61 may not be arranged only in the connection portion 141 if so desired. Instead, the first bonding layer 61 may be arranged only in the bottom of the second recess portion 214 or the first bonding layer 61 may be arranged in both the connection portion 141 and the bottom of the second recess portion 214. In these cases, when the connection portion 141 is arranged in the second recess portion 214, the first bonding layer 61 is arranged between the connection portion 141 and the second recess portion 214.

The second bonding layer 62 may not be arranged only in the extension portion 142 if so desired. Instead, the second bonding layer 62 may be arranged in at least the region of the lower surface of the base portion 21 opposed to the third extension portion 1423 or the second bonding layer 62 may be arranged in both the third extension portion 1423 and at least the region of the lower surface of the base portion 21 opposed to the third extension portion 1423. In either case, when the wiring substrate 14 is arranged on the base portion 21, the second bonding layer 62 is arranged between the extension portion 142 and the lower surface of the base portion 21. The second bonding layer 62 may not be arranged only in the power feeding portion 143 if so desired. Instead, the second bonding layer 62 may be arranged in at least the region of the lower surface of the base portion 21 opposed to the power feeding portion 143 or the second bonding layer 62 may be arranged in both the power feeding portion 143 and the region of the lower surface of the base portion 21 opposed to the power feeding portion 143. In either case, when the wiring substrate 14 is arranged on the base portion 21, the second bonding layer 62 is arranged between the power feeding portion 143 and the lower surface of the base portion 21.

The third bonding layer 63 need not be arranged only in the first extension portion 1421 if so desired. Instead, the second bonding layer 62 may be arranged only in the bottom of the third recess portion 215 or the third bonding layer 63 may be arranged in both the first extension portion 1421 and the bottom of the third recess portion 215. In these cases, when the extension portion 142 is arranged in the third recess portion 215, the third bonding layer 63 is arranged between the first extension portion 1421 and the third recess portion 215.

The second recess portion 214 may not have a recess shape but may instead be a through-hole axially extending through the base portion 21. In that case, it is preferred that a protrusion protruding in the radial direction be arranged in at least a portion of the inner surface of the second recess portion 214. At least one protrusion is arranged on the inner surface of the second recess portion 214. A plurality of protrusions may be arranged on the inner surface of the second recess portion 214 and may be formed so as to surround the second recess portion 214. Therefore, when the wiring substrate 14 is arranged on the base portion 21, the protrusions can axially support the connection portion 141 of the wiring substrate 14.

Figure 7:
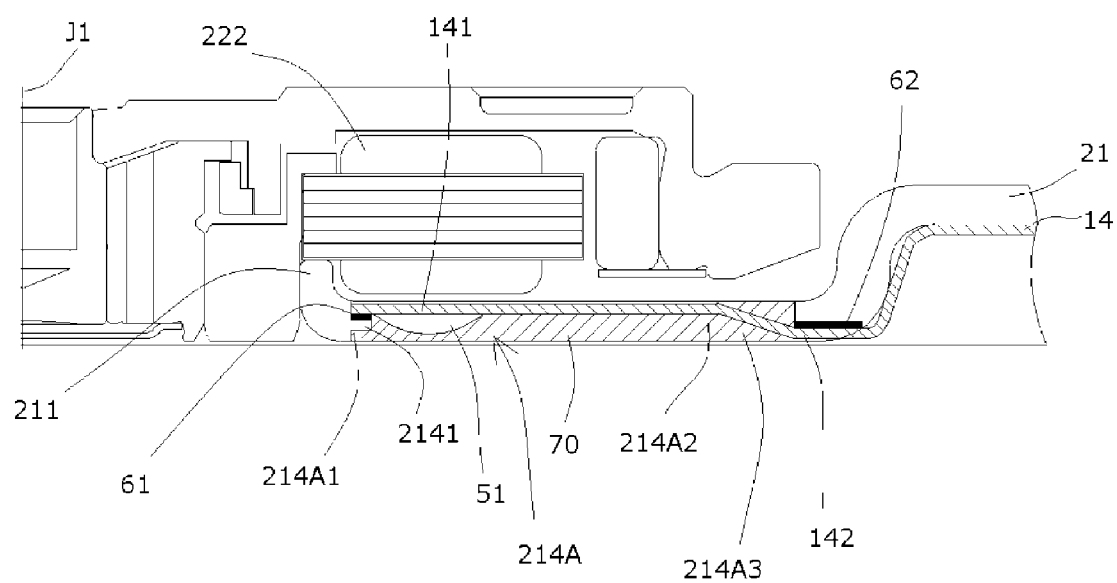
FIG. 7 is a sectional view of a base unit according to a modified example of a preferred embodiment of the present invention.
Figure 8:
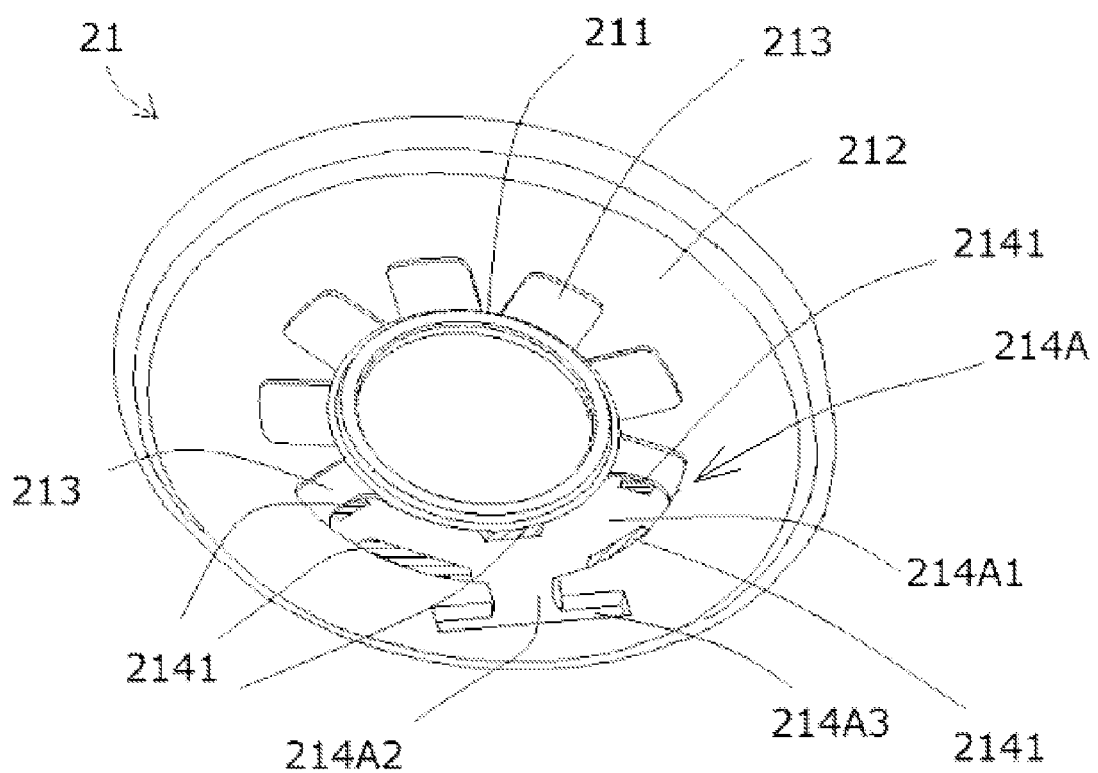
FIG. 8 is a perspective view of the base portion according to the modified example of a preferred embodiment of the present invention.

FIG. 7 is a partial sectional view of a motor 1A according to a modification of a preferred embodiment of the present invention. FIG. 8 is a plan view of the base portion 21 of the modification of a preferred embodiment of the present invention, showing the tubular portion 211 and its vicinities. The same configurations as the motor 1 shown in FIG. 1 will not be described herein below.

Unlike the preferred embodiments described above, the base portion 21 shown in FIGS. 7 and 8 preferably includes a third through-hole 214A. The third through-hole 214A extends axially through the base portion 21. The third through-hole 214A preferably includes a circumferential through-hole portion 214A1, a radial through-hole portion 214A2, and a lead-out through-hole portion 214A3. The circumferential through-hole portion 214A1 extends in the circumferential direction along the tubular portion 211 and extends through the base portion 21 in the axial direction. The radial through-hole portion 214A2 extends radially outward from the circumferential through-hole portion 214A1 and extends through the base portion 21 in the axial direction. The lead-out through-hole portion 214A3 joins the radial through-hole portion 214A2 and extends through the base portion 21 in the axial direction. When viewed axially, the lead-out through-hole portion 214A3 has a contour extending in at least one direction. In this modified example, when viewed axially, the contour of the lead-out through-hole portion 214A3 preferably is rectangular or substantially rectangular. The dimension of the contour of the lead-out through-hole portion 214A3 extending in one direction is larger than the circumferential width of the radial through-hole portion 214A2.

In the third through-hole 214A, the circumferential through-hole portion 214A1, the radial through-hole portion 214A2 and the lead-out through-hole portion 214A3 are continuously joined to one another. In other words, it can be said that the third through-hole 214A is a single through-hole defined by the second through-hole 24, the first through-holes 2121, the second recess portion 214, the third recess portion 215, and the fourth recess portion 216 of the foregoing preferred embodiment. For that reason, when viewed axially, the contour of the third through-hole 214A corresponds in shape to the connection portion 141 and the extension portion 142. It is therefore possible to arrange the connection portion 141 and the extension portion 142 within the third through-hole 214A. More specifically, when the wiring substrate 14 is arranged on the base portion 21, the connection portion 141 is arranged within the circumferential through-hole portion 214A1 and the extension portion 142 is arranged within the radial through-hole portion 214A2. At least a portion of the extension portion 142 is inserted through the lead-out through-hole portion 214A3 and is arranged on the lower surface of the base portion 21.

Only the circumferential through-hole portion 214A1 and the radial through-hole portion 214A2 adjoining each other, or only the radial through-hole portion 214A2 and the lead-out through-hole portion 214A3 adjoining each other, may be continuously joined to each other.

As shown in FIGS. 7 and 8, at least one protrusion 2141 is provided on the inner surface of the third through-hole 214A. In this modified example, a plurality of protrusions 2141 protrudes from the inner surface of the third through-hole 214A (the circumferential through-hole portion 214A1) in the direction perpendicular or substantially perpendicular to the center axis J1. When the wiring substrate 14 is arranged in the third through-hole 214A, the protrusions 2141 axially support the connection portion 141. In this modified example, the protrusions 2141 are respectively arranged radially outward and radially inward of the inner surface of the circumferential through-hole portion 214A1. The protrusions 2141 arranged radially outward and radially inward extend in the circumferential direction along the inner surface of the circumferential through-hole portion 214A1. The protrusions 2141 are respectively arranged at one circumferential side and the other circumferential side of the inner surface of the circumferential through-hole portion 214A1. The protrusions 2141 arranged in the circumferential direction radially or substantially radially extend along the inner surface of the circumferential through-hole portion 214A1. In other words, the respective protrusions 2141 extend from the inner surface of the circumferential through-hole portion 214A1 in the direction perpendicular or substantially perpendicularly to the center axis J1.

The protrusions 2141 are opposed to at least one of the respective solder portions 51 in a spaced-apart relationship. On the inner surface of the circumferential through-hole portion 214A1, the respective protrusions 2141 are arranged in the same axial positions. Therefore, when the wiring substrate 14 is arranged in the third through-hole 214A, the wiring substrate 14 is arranged parallel or substantially parallel in the direction perpendicular to the center axis J1.

As shown in FIG. 7, the first bonding layer 61 is arranged between the connection portion 141 and at least one of the protrusions 2141. Therefore, when the wiring substrate 14 is arranged within the third through-hole 214A, the connection portion 141 is fixed to the protrusions 2141.

The first bonding layer 61 may be arranged in at least one of the protrusions 2141, the regions of the connection portion 141 opposed to the protrusions 2141, and the periphery of the connection portion 141. However, the protrusions 2141 are not axially opposed to the lands 1411 of the connection portion 141.

The second bonding layer 62 is arranged on the third extension portion 1423. The third extension portion 1423 is a region of the extension portion 142 opposed to the lower surface of the base portion 21. In this modified example, the third bonding layer 63 is not arranged on the extension portion 142. At least one of the first bonding layer 61 and the second bonding layer 62 is not arranged in the second extension portion 1422 of the extension portion 142 extending through the second through-hole 24. In an even more preferred embodiment, neither the first bonding layer 61 nor the second bonding layer 62 is arranged in the second extension portion 1422.

As shown in FIG. 7, the inside of the third through-hole 214A is preferably sealed by a resin member 70. At least a portion of the extension portion 142 and the connection portion 141 are sealed within the third through-hole 214A together with the resin member 70. The solder portions 51 are also sealed within the third through-hole 214A by the resin member 70. It is preferred that the resin member 70 be an insulating member through which an electric current cannot pass.

Thus, dust or the like is prevented from entering the inside of the motor 1 at the side of the lower surface of the base portion 21. At least a portion of the extension portion 142 and the connection portion 141 are fixed within the third through-hole 214A. As a result, as compared with the foregoing preferred embodiment, the bonding area of the first bonding layer to the base portion 21 grows smaller. Even if the third bonding layer 63 is absent and even if a shock or force is applied from the outside, the wiring substrate 14 is hardly detached from the base portion 21.

The third through-hole 214A may not be fully filled with the resin member 70. It may be possible to use a structure in which the resin member 70 is arranged in only a portion of the inside of the third through-hole 214A. For example, the resin member 70 may be arranged around the region where the wiring substrate 14 arranged within the third through-hole 214A makes contact with the inner surface of the third through-hole 214A or around the region where the protrusions 2141 make contact with the connection portion 141. Even in this case, the resin member 70 can fix the wiring substrate 14 within the third through-hole 214A. As a result, even if a shock or force is applied from the outside to the base portion 21, the wiring substrate 14 is will not, or will only barely be detached from the base portion 21.

It is preferred that, when the resin member 70 is arranged within the third through-hole 214A, the axial upper surface of the resin member 70 is positioned axially lower than the upper surface of the base portion 21. Similarly, it is preferred that, when the resin member 70 is arranged within the third through-hole 214A, the axial lower surface of the resin member 70 is positioned axially higher than the lower surface of the base portion 21.

At the side of the lower surface of the base portion 21, the third through-hole 214A, within which the resin member 70 is arranged, may be covered with the aforementioned seal member 50. This preferably eliminates the possibility that the resin member 70 is exposed on the lower surface of the base portion 21. As a result, when a shock or force is applied from the outside to the base portion 21, it is possible for the seal member 50 to protect the resin member 70. In particular, if the resin member 70 is arranged in only a portion of the inside of the third through-hole 214A and if a space is left within the third through-hole 214A, the seal member 50 covers the opening of the third through-hole 214A existing on the lower surface of the base portion 21 so as to prevent dust or the like from entering the third through-hole 214A.

The number, position, and shape of the protrusions 2141 is not particularly limited. The protrusions 2141 may be arranged along the inner surface of the third through-hole 214A in a spaced-apart relationship. When viewed axially, a single protrusion 2141 may be substantially annularly provided on the inner surface of the third through-hole 214A.

At least one protrusion 2141 may be arranged in the radial through-hole portion 214A2. For example, one or more protrusions 2141 are respectively arranged on one circumferential side surface and the other circumferential side surface of the radial through-hole portion 214A2 such that the one or more protrusions 2141 are arranged to protrude in the circumferential direction. The protrusions 2141 thus arranged radially extend along one circumferential side surface and the other circumferential side surface of the radial through-hole portion 214A2. The axial heights of the protrusions 2141 with respect to the base portion 21 are preferably equal or substantially equal to one another. For that reason, when the wiring substrate 14 is arranged within the third through-hole 214A, the protrusions 2141 can support the extension portion 142 so that the extension portion 142 can become parallel or substantially parallel to the direction perpendicular or substantially perpendicular to the center axis J1.

In the event that at least one protrusion 2141 is arranged within the radial through-hole portion 214A2, the third bonding layer 63 may be arranged between the extension portion 142 and the protrusion 2141. The third bonding layer 63 is arranged in advance in at least one of the protrusion 2141 and the region of the extension portion 142 opposed to at least the protrusion 2141. When the wiring substrate 14 is arranged in the base portion 21, the third bonding layer 63 is arranged between the extension portion 142 and the protrusion 2141.

The protrusion 2141 arranged within the radial through-hole portion 214A2 may radially extend on at least one of one circumferential side surface and the other circumferential side surface and may extend to the circumferential through-hole portion 214A1. In addition, a plurality of protrusions 2141 may be arranged at a regular interval or at an irregular interval on at least one of one circumferential side surface and the other circumferential side surface.

At least one protrusion 2141 may be arranged on the inner surface of the lead-out through-hole portion 214A3. The protrusion 2141 extends in the direction substantially perpendicular to the center axis J1.

In the foregoing preferred embodiment, preferably three-phase lead wires 2221 of U, V, and W phases are all connected to the lands 1411 of the wiring substrate 14. In that case, a common wire is connected to the three lead wires 2221 at the side of the stator, but is not directly connected to the connection portion 141. Alternatively, the common wire may be connected to the connection portion 141 in place of the stator. In that case, the number of the first through-holes 2121 can be set to be four, including the ones for the three lead wires 2221 and the one for the common wire. As long as short circuiting or mutual contact is prevented, one of the common wire and the three lead wires 2221 may be arranged within each of the first through-holes 2121 together with the remaining lead wires 2221. This configuration makes it possible to reduce the required number of the first through-holes 2121. As a result, it is possible to minimize the reduction of rigidity of the base portion 21 otherwise caused by the arrangement of the first through-holes 2121.

In FIGS. 2 and 3, the circumferential width of the second through-hole 24 differs from the circumferential width of the groove 26. However, the circumferential width of the second through-hole 24 need not necessarily differ from the circumferential width of the groove 26. The circumferential width of the second through-hole 24 may be substantially equal to the circumferential width of the groove 26.

Similarly, in the foregoing preferred embodiments, the circumferential width of the second through-hole 24 differs from the circumferential width of the third recess portion 215. However, the circumferential width of the second through-hole 24 need not necessarily differ from the circumferential width of the third recess portion 215. Instead, the circumferential width of the second through-hole 24 may be substantially equal to the circumferential width of the third recess portion 215.

When viewed axially, the first through-holes 2121 preferably have the same contour. However, the first through-holes 2121 may differ in contour from one another and/or the first through-holes 2121 may differ in size and orientation from one another. The first through-holes 2121 may have a contour extending in at least one direction. The direction in which the dimension of the contour of the first through-holes 2121 becomes largest when viewed axially may be the longitudinal direction. The first through-holes 2121 may have contours respectively extending in different directions.

In the foregoing preferred embodiments, the first bonding layer 61 and the third bonding layer 63 are preferably arranged on one surface of the wiring substrate 14 while the second bonding layer 62 is preferably arranged on the other surface of the wiring substrate 14. However, the first bonding layer 61, the second bonding layer 62, and the third bonding layer 63 may be arranged on the same surface of the wiring substrate 14. In other words, the respective bonding layers may be arranged on only one surface of the wiring substrate 14. In particular, the lands 1411 are arranged in the connection portion 141. For that reason, it is preferred that the second bonding layer 62 be arranged on the surface on which the first bonding layer 61 and the third bonding layer 63 exist.

Figure 9:
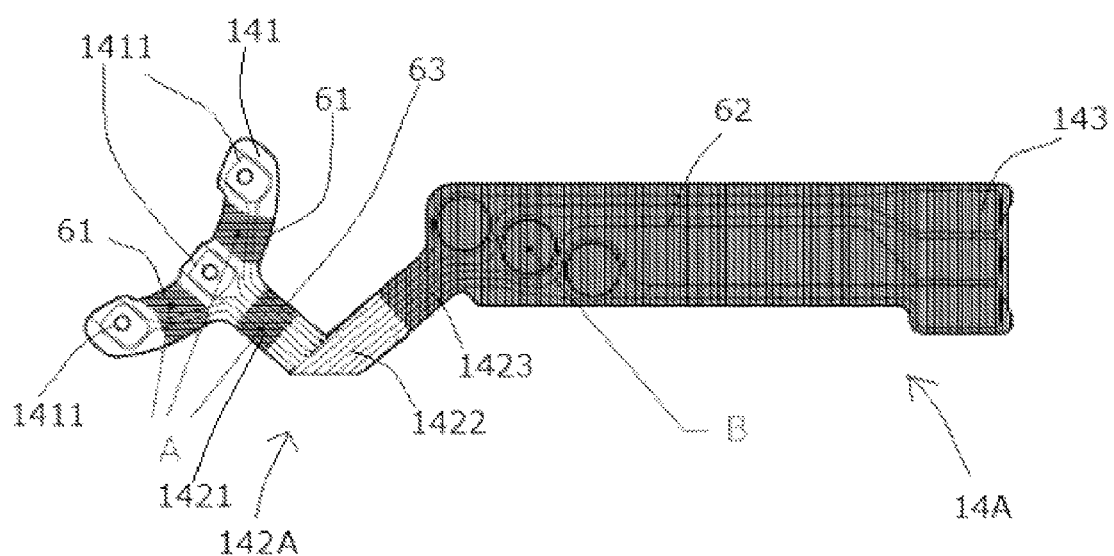
FIG. 9 is a plan view of a wiring substrate according to a modified example of a preferred embodiment of the present invention.

FIG. 9 is a view showing one modified example of the wiring substrate. Referring to FIG. 9, the wiring substrate 14A preferably includes a connection portion 141 and an extension portion 142A. The extension portion 142A differs only in the arrangement of the second bonding layer 62 from the extension portion of the foregoing preferred embodiment but remains the same in shape as the extension portion of the foregoing preferred embodiment. In other words, the extension portion 142A preferably includes a first extension portion 1421, a second extension portion 1422, a third extension portion 1423, and a power feeding portion 143.

On one surface of the wiring substrate 14A, the first bonding layer 61 is arranged in the connection portion 141. The second bonding layer 62 and the third bonding layer 63 are arranged in the extension portion 142A on one surface of the wiring substrate 14A.

The extension portion 142A is bent at one point. In this modified example, the extension portion 142A is bent in the second extension portion 1422. Accordingly, one surface of the second extension portion 1422 is opposed to one side thereof. For that reason, the second bonding layer 62 arranged on one surface of the wiring substrate 14A faces toward the other surface of the wiring substrate 14A. As a result, even if the first bonding layer 61, the second bonding layer 62, and the third bonding layer 63 are arranged on one surface of the wiring substrate 14A, the second bonding layer 62 can be caused to face the lower surface of the base portion 21 during the assembling process of the motor, whereby the second bonding layer 62 can be bonded to the lower surface of the base portion 21. Therefore, as compared with a case where the respective bonding layers are arranged on two opposing surfaces of the wiring substrate, the manufacture of the wiring substrate 14A is easy and the cost of the wiring substrate 14A is reduced such that it is possible to reduce the manufacturing cost of the motor.

It is preferred that the bent region of the second extension portion 1422 be arranged within the second through-hole 24. This prevents the bent region from protruding from the upper surface or the lower surface of the base portion 21.

The extension portion 142A may be bent a plurality of times in the second extension portion 1422 or may be bent at least once in other region. For example, the extension portion 142A may be bent in the first extension portion 1421. In that case, it is preferred that the bent region of the first extension portion 1421 be accommodated within the third recess portion 215. The extension portion 142A may be bent in the third extension portion 1423. In that case, it is preferred that the third extension portion 1423 be accommodated within the groove 26.

Figure 10:
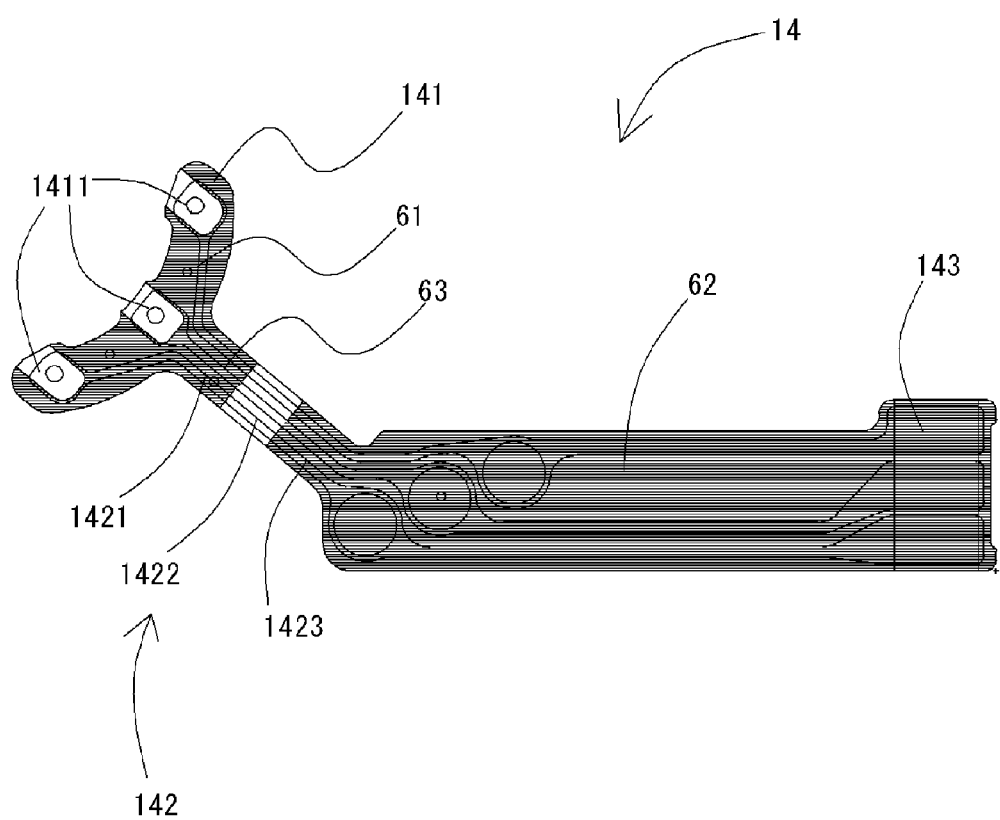
FIG. 10 is a view of a wiring substrate according to another modified example of a preferred embodiment of the present invention.

FIG. 10 is a view showing another modified example of the wiring substrate. Referring to FIG. 10, the first bonding layer 61 is arranged on the surface of the connection portion 141 other than the lands 1411. In other words, the first bonding layer 61 is arranged in the region around the lands 1411 of the connection portion 141, in the gaps between the lands 1411 adjoining one another, and in the region where the connection portion 141 is connected to the extension portion 142.

Since the first bonding layer 61 is arranged in the region where the connection portion 141 is connected to the extension portion 142, the third bonding layer 63 arranged in the first extension portion 1421 is continuously joined to the first bonding layer 61.

While the respective bonding layers are arranged on the wiring substrate in the preferred embodiments and the modified examples described above, it may be possible to arrange the respective bonding layers on the regions of the base portion opposed to the regions of the wiring substrate set forth above.

The motor 1 of the foregoing preferred embodiments is preferably a three-phase motor, for example. However, the number of phases of the motor need not be particularly limited. For example, it may be possible to provide a single-phase motor or a multiple-phase motor such as, for example, a two-phase motor, a five-phase motor, or a seven-phase motor. In that case, the number of the second through-holes 2121 arranged in the second recess portion 214 may be changed in conformity with the number of the lead wires 2221 or the treatment method of the common wire.

Preferred embodiments of the present invention can be used in a motor for a disk drive apparatus or in a motor for other applications than the disk drive apparatus.

Features of the above-described preferred embodiments and the modifications thereof may be combined appropriately as long as no conflict arises.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A base unit for use in a disk drive apparatus, comprising:
a stator including a plurality of coils;
a wiring substrate electrically connected to the stator; and
a base portion including an upper surface and a lower surface; wherein
the base portion includes a tubular portion in which the stator is arranged, a first recess portion arranged on the upper surface of the base portion so as to surround the tubular portion, and a plurality of first through-holes arranged within the first recess portion to extend through the upper surface and the lower surface of the base portion;
the wiring substrate includes a connection portion arranged on the upper surface of the base portion and provided with a plurality of lands electrically connected to the coils, a power feeding portion arranged on the lower surface of the base portion and an extension portion arranged to interconnect the connection portion and the power feeding portion;
the plurality of first through-holes axially overlap with at least a portion of at least one of the plurality of lands; at least one lead wire is led out from at least one of the coils; the lead wire is soldered to a corresponding one of the plurality of lands within a corresponding one of the plurality of first through-holes;
a first bonding layer is arranged between the connection portion and a bottom of the first recess portion to bond the connection portion and the bottom of the first recess portion together; and
a second bonding layer is arranged between the power feeding portion and the lower surface of the base portion to bond the power feeding portion and the lower surface of the base portion together.

2. The base unit of claim 1, wherein the first bonding layer is arranged around the plurality of lands.

3. The base unit of claim 2, wherein the plurality of lands are arranged to define gaps between adjacent ones of the plurality of lands, and the first bonding layer is arranged in the gaps.

4. The base unit of claim 1, wherein the first bonding layer includes a sheet-shaped sticky material or an adhesive agent, the first bonding layer being arranged in the connection portion to exist in at least one of a periphery of at least one of the plurality of lands and a gap between at least one set of the plurality of lands adjoining each other.

5. The base unit of claim 1, wherein the first bonding layer includes a sheet-shaped sticky material or an adhesive agent, the first bonding layer being arranged in the first recess portion to exist in at least one of a periphery of at least one of the plurality of first through-holes and a gap between one set of the plurality of first through-holes adjoining each other.

6. The base unit of claim 1, wherein the first bonding layer is arranged around the plurality of lands and between adjacent ones of the plurality of lands.

7. The base unit of claim 6, wherein the first bonding layer is further arranged in a region where the connection portion and the extension portion are joined to each other.

8. The base unit of claim 1, wherein the base portion further includes a second through-hole arranged within the first recess portion to extend through the upper surface and the lower surface of the base portion, the extension portion extending from the upper surface of the base portion to the lower surface of the base portion through the second through-hole.

9. The base unit of claim 8, wherein a second recess portion circumferentially extending about the tubular portion is arranged in the first recess portion, at least a portion of the connection portion being arranged in the second recess portion.

10. The base unit of claim 9, wherein a coil receiving portion arranged to accommodate the coils is arranged in the first recess portion, and the plurality of first through-holes is arranged in the second recess portion.

11. The base unit of claim 9, wherein a third recess portion extending from the second recess portion toward the second through-hole is arranged in the first recess portion, and the extension portion extends from the third recess portion to the lower surface of the base portion through the second through-hole.

12. The base unit of claim 11, wherein a fourth recess portion at least partially overlapping with the second recess portion in an axial direction is arranged on the lower surface of the base portion, and the second through-hole is joined to the fourth recess portion.

13. The base unit of claim 12, wherein the fourth recess portion is covered with a sheet-shaped seal member having a shape similar to a contour of the fourth recess portion.

14. The base unit of claim 13, wherein an axial dimension of the seal member is equal to or smaller than an axial dimension of the fourth recess portion.

15. The base unit of claim 8, wherein a third bonding layer is arranged between the extension portion and the upper surface of the base portion.

16. The base unit of claim 15, wherein the wiring substrate includes a cover layer with which the first bonding layer or the third bonding layer makes contact, a conductive wire layer positioned at the opposite side of the first bonding layer or the third bonding layer and arranged below the cover layer and a base layer positioned at the opposite side of the cover layer and arranged below the conductive wire layer, and the second bonding layer contacts with the base layer.

17. The base unit of claim 16, wherein at least one of the second bonding layer and the third bonding layer is not arranged in a region of the extension portion extending through the second through-hole.

18. The base unit of claim 8, wherein, when viewed axially, the second through-hole has a rectangular or substantially rectangular contour, and the second through-hole has a longitudinal width larger than a width of the extension portion.

19. The base unit of claim 8, wherein a groove extending radially outward from an end of the second through-hole is arranged on the lower surface of the base portion, and the extension portion is arranged on the lower surface of the base portion to extend through the groove.

20. A disk drive apparatus, comprising:
    a base unit of claim 1;
    a rotor rotatable with respect to the stator;
    at least one disk attached to the rotor; and
    an access unit arranged to perform at least one of tasks of reading and writing information from and on the disk.

21. A base unit for use in a disk drive apparatus, comprising:
    a stator including a plurality of coils; and
    a wiring substrate electrically connected to the stator; and
    a base portion including an upper surface and a lower surface; wherein
    the base portion includes a tubular portion in which the stator is arranged, a first recess portion arranged on the upper surface of the base portion so as to surround the tubular portion, and a plurality of first through-holes arranged within the first recess portion to extend through the upper surface and the lower surface of the base portion;
    the wiring substrate includes a connection portion arranged on the upper surface of the base portion and provided with a plurality of lands electrically connected to the coils, a power feeding portion arranged on the lower surface of the base portion, and an extension portion arranged to interconnect the connection portion and the power feeding portion;
    the plurality of first through-holes axially overlaps with at least a portion of at least one of the plurality of lands; at least one lead wire is led out from at least one of the coils; the at least one lead wire is soldered to a corresponding one of the plurality of lands within a corresponding one of the plurality of first through-holes;
    a first bonding layer is arranged between the connection portion and a bottom of the first recess portion to bond the connection portion and the bottom of the first recess portion together;
    a second bonding layer is arranged between the power feeding portion and the lower surface of the base portion to bond the power feeding portion and the lower surface of the base portion together; and
    a third bonding layer is arranged between a surface of the extension portion opposed to the upper surface of the base portion and the upper surface of the base portion to bond the surface of the extension portion opposed to the upper surface of the base portion and the upper surface of the base portion together.

22. The base unit of claim 21, wherein the first bonding layer is arranged around the plurality of lands.

23. The base unit of claim 21, wherein the plurality of lands are arranged to leave gaps between ones of the plurality of lands adjoining one another, and the first bonding layer is arranged in the gaps.

24. The base unit of claim 21, wherein the first bonding layer includes a sheet-shaped sticky material or an adhesive agent, the first bonding layer being arranged in the connection portion to exist in at least one of a periphery of at least one of the plurality of lands and a gap between at least one set of the lands adjoining each other.

25. The base unit of claim 21, wherein the first bonding layer includes a sheet-shaped sticky material or an adhesive agent, the first bonding layer being arranged in the first recess portion to exist in at least one of a periphery of at least one of the first through-holes and a gap between one set of the first through-holes adjoining each other.

26. The base unit of claim 21, wherein the first bonding layer is arranged around the plurality of lands and between ones of the plurality of lands adjoining one another.

27. The base unit of claim 26, wherein the first bonding layer is further arranged in a region where the connection portion and the extension portion are joined to each other.

28. A base unit for use in a disk drive apparatus, comprising:
    a stator including a plurality of coils;
    a wiring substrate electrically connected to the stator; and
    a flat base portion including an upper surface and a lower surface; wherein
    the base portion includes a tubular portion in which the stator is arranged, a first recess portion arranged on the upper surface of the base portion so as to surround the tubular portion, and a through-hole arranged within the first recess portion to extend through the upper surface and the lower surface of the base portion;
    the wiring substrate includes a connection portion at least partially arranged within the through-hole and provided with a plurality of lands electrically connected to the coils and an extension portion joined to the connection portion and arranged on the lower surface of the base portion through the through-hole;
    at least one protrusion arranged to support the connection portion is arranged on an inner surface of the through-hole to protrude in a direction perpendicular or substantially perpendicular to a thickness direction of the base portion; at least one lead wire is led out from at least one of the coils; the lead wire is soldered to a corresponding one of the plurality of lands within the through hole;
    a first bonding layer is arranged between the connection portion and the protrusion to bond the connection portion and the protrusion together; and a second bonding layer is arranged between the extension portion and the lower surface of the base portion to bond the extension portion and the lower surface of the base portion together.

29. The base unit of claim 28, wherein the first bonding layer is arranged around the plurality of lands.

30. The base unit of claim 28, wherein the first bonding layer includes a sheet-shaped sticky material or an adhesive agent, the first bonding layer being arranged in at least one of at least a portion of the protrusion, a region of the connection portion opposed to the protrusion, and a periphery of the connection portion.

31. The base unit of claim 28, wherein at least one of the first bonding layer and the second bonding layer is not arranged in a region of the extension portion extending through the through-hole.

32. The base unit of claim 28, wherein the through-hole includes a circumferential through-hole portion extending circumferentially along the tubular portion, a radial through-hole portion extending radially outward from the circumferential through-hole portion, and a lead-out through-hole portion joined to the radial through-hole portion, the lead-out through-hole portion having a rectangular or substantially rectangular shape when viewed axially, the lead-out through-hole portion having a longitudinal width larger than a width of the extension portion.

33. The base unit of claim 28, wherein the through-hole is sealed by a resin member on the lower surface of the base portion.

34. The base unit of claim 28, wherein the through-hole is sealed by a sheet-shaped seal member on the lower surface of the base portion.

35. A disk drive apparatus, comprising:
a base unit of claim 28;
a rotor rotatable with respect to the stator;
at least one disk attached to the rotor; and
an access unit arranged to perform at least one of tasks of reading and writing information from and on the disk.

* * * * *